United States Patent [19]

Kawana et al.

[11] Patent Number: 4,696,862

[45] Date of Patent: Sep. 29, 1987

[54] MAGNETIC RECORDING MEDIUM

[75] Inventors: Takahiro Kawana, Tagajo; Norio Yokoyama, Sendai, both of Japan

[73] Assignee: Sony Corporation, Tokyo, Japan

[21] Appl. No.: 459,602

[22] PCT Filed: May 21, 1982

[86] PCT No.: PCT/JP82/00185

§ 371 Date: Jan. 12, 1983

§ 102(e) Date: Jan. 12, 1983

[87] PCT Pub. No.: WO82/04158

PCT Pub. Date: Nov. 25, 1982

[30] Foreign Application Priority Data

May 22, 1981 [JP] Japan .................................. 56-77539

[51] Int. Cl.$^4$ ............................................. G11B 5/66
[52] U.S. Cl. .................................... 428/336; 428/457; 428/469; 428/693; 428/694; 428/900
[58] Field of Search .............................. 427/127–132, 427/48; 428/900, 928, 694, 695, 457, 469, 336

[56] References Cited

U.S. PATENT DOCUMENTS 3,691,032 9/1972 Luborsky et al. .................. 204/40
4,239,835 12/1980 Iijima et al. ........................ 428/611

FOREIGN PATENT DOCUMENTS 1521315 1/1973 Fed. Rep. of Germany .

Primary Examiner—Bernard D. Pianalto
Attorney, Agent, or Firm—Hill, Van Santen, Steadman & Simpson

[57] ABSTRACT

A magnetic recording medium includes a metal magnetic layer (4) formed on a nonmagnetic base (1). On one major surface (1A) of the nonmagnetic base (1) is formed a metal layer (2) at least the surface of which is oxidized, nitrogenated or carbonized on which the metal magnetic layer (4) is further formed. This magnetic recording medium is capable of improving the durability of the metal magnetic layer (4).

6 Claims, 5 Drawing Figures

MAGNETIC RECORDING MEDIUM

DESCRIPTION

1. Technical Field

This invention relates to a magnetic recording medium and particularly to a so-called thin film magnetic recording medium having a metal magnetic layer formed on a nonmagnetic base and especially to improve the durability such as adhesion to the nonmagnetic base, wear-proof property and so on the metal magnetic layer.

2. Background Art

While it was previously proposed in this kind of a thin film magnetic recording medium tha a continuous film made of a metal such as Al, Ti and so on or organic substance should be interposed between a nonmagnetic base and a metal magnetic layer for the purpose of increasing the adhesion of the metal magnetic layer to the nonmagnetic base, this was far from satisfactory.

DISCLOSURE OF INVENTION

According to the invention, a metal layer at least the surface of which is oxidized, nitrogenated or carbonized is formed on one major surface of a nonmagnetic base on which a metal magnetic layer is further formed. According to this invention, the durability of the metal magnetic layer of the magnetic recording medium can be improved (from several times to ten-odds times as that of the prior art), resulting in a magnetic recording medium of high reliability.

BEST MODE FOR CARRYING OUT THE INVENTION

Figure 1:
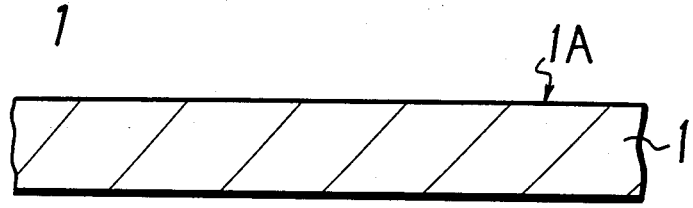
FIGS. 1 through 5 are cross-sectional diagrams each showing an example of a magnetic recording medium of this invention in the order of its manufacturing process.

Referring to the drawings, a magnetic recording medium according to this invention will hereinafter be described in detail in conjunction with a manufacturing process thereof.

In the present invention, first, as shown in FIG. 1, there is prepared a nonmagnetic base, for example, a polyethylene telephthalate-base 1, and then one major surface 1A of the base 1 is subjected to activation treatment. This activation treatment is performed by disposing the nonmagnetic base in plasma of an atmosphere gas generated by corona discharge in an atmosphere containing low pressure oxygen, for example, vacuum degree of the atmosphere is from $10^{-1}$ to 10 torr. As an example of the atmosphere, there can be utilized atmosphere of a mixed gas of 70% of Ar with 30% of $O_2$ in which the pressure of $O_2$ gas is $10^{-3}$ torr (hereinafter, this atmosphere is called atmosphere a). But, the atmosphere gas for this activation treatment to be activated is not limited to gas containing oxygen, but any gas, for example, even argon gas alone makes the activation treatment possible.

Figure 2:
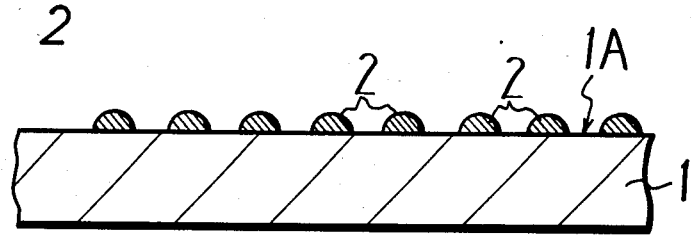

Next, as shown in FIG. 2, on the activated major surface 1A of the base 1 is formed by a process such as vacuum deposition, sputtering or the like a discontinuous film, namely, island-shaped portions 2 made of metal or cobalt Co which the example of this invention utilizes. The island-shaped portions 2 have a mean film thickness of about 10 to 1000 Å or about 300 Å the example of this invention utilizes. For the metal which is utilized for the island-shaped portion 2, there can be employed Al, Ti and so on other than Co. Nonetheless, Co is most preferable, the reason of which is that since Co is the same as the component of a metal magnetic layer which will be formed later, only one evaporating source is enough, giving rise to improvement of productivity. As a manner of the vacuum deposition, while either of vertical and oblique evaporations can be utilized, the oblique evaporation rather allows the discontinuous island-shaped portions to rather easily be formed.

Figure 3:
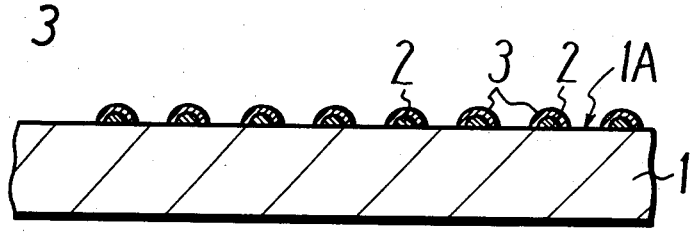

Next, as shown in FIG. 3, the oxidizing atmosphere (gas containing more than 20% of $O_2$ gas (the remaining gas is inert gas)), nitrogenating atmosphere (gas containing $N_2$) or carbonizing atmosphere (acetylene gas, ethylene gas and so on), is formed and applied with a DC voltage to this atmosphere gas to generate plasma of the atmosphere gas. Then, exposing the base film on which the metal layer was formed as the island-shape to this plasma, the surface of the island-shaped portions 2 or the overall inside thereof is formed as oxide, nitride or carbide 3. For the condition of plasma, atmosphere gas of gas pressure ranging from $10^{-1}$ to $10^{-4}$ torr is introduced and the voltage to be applied is selected in the range from several hundred volts to several thousand volts. In the example of this invention, the surface of the island-shaped portions is treated in the plasma which was generated in the aforesaid atmosphere a containing oxygen to form the oxide 3 of cobalt on the surface of the island-shaped portions 2 made of cobalt.

In the process of FIG. 2, under the oxidizing atmosphere, nitrogenating atmosphere or the carbonizing atmosphere, the oxide, nitride or carbide of metal may also be formed by a reactive ion-plating process or activated reactive evaporation process as the island-shaped portions 2.

Figure 4:
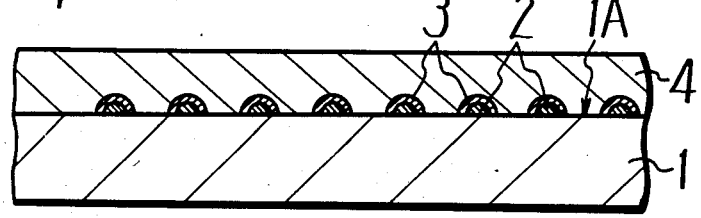

Next, as shown in FIG. 4, on the major surface 1A of the base 1 including the island-shaped portions 2 is formed a metal magnetic layer 4 according to vacuum deposition, sputtering or the like means. As the metal magnetic layer 4, there can be utilized cobalt, cobalt-nickel or cobalt-nickel containing a small amount of iron or the like. The metal magnetic layer 4 has a film thickness in a range from 700 Å to 2000 Å or about 1500 Å according to the example of this invention and is formed by the oblique evaporation.

Figure 5:
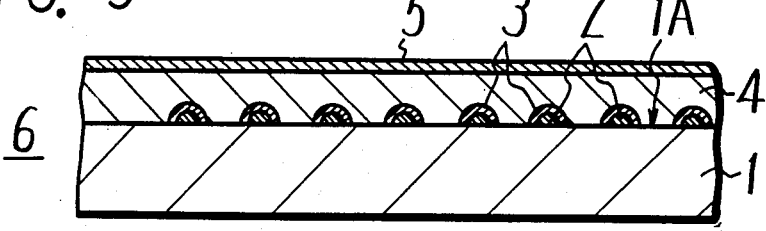

As shown in FIG. 5, the outermost surface of the metal magnetic layer 4 is subjected to the plasma treatment to form a layer 5 made of oxide, nitride, carbide, and so on. With the example of this invention, the surface of the metal magnetic layer is treated by the plasma produced in the aforesaid atmosphere a containing oxygen to form the oxide layer 5 on the surface of the metal magnetic layer 4.

Thus, a desired magnetic recording medium 6 can be produced.

According to such magnetic recording medium, on one major surface 1A of the magnetic base 1, there is formed the discontinuous island-shaped portion 2 at least the surface of which is oxidized, nitrogenated or carbonized through which the metal magnetic layer 4 is formed on the base 1 so that the metal magnetic layer 4 can be strongly bonded to the base 1. This may be considered that the adhesion of the oxide, the nitride or the carbide 3 which was formed by the plasma treatment of the island-shaped portion 2 to the base 1 is strong so that the adhesion of the metal magnetic layer 4 formed thereon to the base 1 on their boundary is improved. Forming continuously the layer 5 made of the oxide, nitride or carbide on the outermost surface of the metal magnetic layer 4 by plasma treatment enables an improved wear-proof property of the metal magnetic layer 4.

When the metal magnetic layer 4 is formed by the oblique evaporation, in order that an incident angle $\theta$ at which a vapor-flow (flow of evaporated particle) is introduced into the base (in this case, the base is formed as a tape-shape) 1 may be made constant in each part of its evaporation range, the evaporation may be made while moving the base 1 along a predetermined curve. The constant incident angle $\theta$ made so far enables high coercive force Hc and squareness ratio as were determined in advance to be established and also efficiency of evaporation to be improved.

We claim:

1. A magnetic recording medium comprising a nonmagnetic base, a metal discontinuous layer formed on one major surface of said nonmagnetic base as discrete island shapes and at least the surfaces of which are oxidized, nitrogenated or carbonized, and a metal magnetic layer formed so as to cover completely said discontinuous layer and the portions of said nonmagnetic base which extend between said discrete island shapes.

2. A magnetic recording medium according to claim 1, wherein said discontinuous layer has a mean film thickness ranging from 10 to 1000 Å.

3. A magnetic recording medium according to claim 1, wherein the metal forming said discontinuous layer is cobalt.

4. A magnetic recording medium according to claim 3, wherein the surface of said discontinuous layer is made of cobalt oxide.

5. A magnetic recording medium according to claim 1, wherein said metal magnetic layer is made of cobalt or an alloy whose main component is cobalt.

6. A magnetic recording medium according to claim 1, wherein said metal magnetic layer has on its surface formed a layer made of oxide, nitride or carbide of metal constructing said metal magnetic layer.

* * * * *